United States Patent
Terry

(10) Patent No.: US 8,868,007 B2
(45) Date of Patent: Oct. 21, 2014

(54) DC OFFSET CANCELLATION

(75) Inventor: Andrew Terry, Picton (AU)

(73) Assignee: Broadcom Corporation, Irvine, CA (US)

( * ) Notice: Subject to any disclaimer, the term of this patent is extended or adjusted under 35 U.S.C. 154(b) by 159 days.

(21) Appl. No.: 13/601,482

(22) Filed: Aug. 31, 2012

(65) Prior Publication Data

US 2014/0065979 A1    Mar. 6, 2014

(51) Int. Cl.
*H04B 1/38*    (2006.01)

(52) U.S. Cl.
USPC ......... 455/73; 455/63.1; 455/130; 455/226.1; 455/296

(58) Field of Classification Search
CPC .............. H04B 1/40; H04B 1/10; H04B 1/16
USPC ............... 455/501, 46, 63.1, 67.13, 130, 73, 455/226.1, 296
See application file for complete search history.

(56) References Cited

U.S. PATENT DOCUMENTS

| | | | |
|---|---|---|---|
| 7,394,310 B2* | 7/2008 | Chen | 327/561 |
| 2009/0154595 A1* | 6/2009 | Choksi et al. | 375/295 |
| 2011/0286553 A1* | 11/2011 | Min et al. | 375/319 |

* cited by examiner

*Primary Examiner* — Tuan Pham
(74) *Attorney, Agent, or Firm* — Garlick & Markison; Randy W. Lacasse

(57) ABSTRACT

Communication processing paths include distortions, such as DC offset in the baseband analog path which needs to be accounted for. The use of a digital-to-analog converter (DAC) to inject a DC offset cancellation signal can bring about noise/area/power advantages. The DAC is driven by a mixed signal low pass filter loop. However, the DAC could also be driven in an open loop system, or a combination of open and closed loop. A low noise sign and magnitude DAC with low area and power requirements is implemented using selectively connected programmable current sources to virtual earth input terminals on a transimpedance amplifier (TIA) op-amp circuit. The constant virtual earth voltage eliminates linearity problems that would otherwise exist due to the finite current source output impedance. Current sources are only switched in when required so unneeded sources are out of circuit and do not contribute noise or use any power.

20 Claims, 10 Drawing Sheets

DC OFFSET CANCELLATION

BACKGROUND OF THE INVENTION

1. Technical Field of the Invention

This invention relates generally to wireless communications and more particularly to circuits used to support wireless communications.

2. Description of Related Art

Communication systems are known to support wireless and wireline communications between wireless and/or wireline communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, 3GPP, LTE, LTE Advanced, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to one or more antennas (e.g., MIMO) and may include one or more low noise amplifiers, one or more intermediate frequency stages, a filtering stage, and a data recovery stage. The low noise amplifier(s) receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Currently, wireless communications occur within licensed or unlicensed frequency spectrums. For example, wireless local area network (WLAN) communications occur within the unlicensed Industrial, Scientific, and Medical (ISM) frequency spectrum of 900 MHz, 2.4 GHz, and 5 GHz. While the ISM frequency spectrum is unlicensed there are restrictions on power, modulation techniques, and antenna gain. Another unlicensed frequency spectrum is the V-band of 55-64 GHz.

A direct-conversion receiver (DCR), also known as homodyne, synchrodyne, or zero-IF receiver, is a radio receiver design that demodulates the incoming radio signal using synchronous detection driven by a local oscillator whose frequency is identical to, or very close to the carrier frequency of the intended signal.

In direct conversion receivers, a method of cancelling DC offsets is almost always needed. Traditionally, this cancellation has been achieved by using a low-pass analog feedback circuit, sometimes known as a DC servo. To prevent saturation of the receiver (Rx) signal chain, the output of the DC servo circuit needs to be fed in prior to high gain signal processing stages. A consequence of this is that the noise from the servo circuit undergoes amplification along with the desired signal. Therefore, the servo circuit needs to be low noise. In an analog feedback circuit, low noise, low area and low power cannot be simultaneously achieved. DC servo loops, both fully analog and mixed signal are known.

Disadvantages of conventional approaches will be evident to one skilled in the art when presented in the disclosure that follows.

BRIEF SUMMARY OF THE INVENTION

The technology described herein is directed to an apparatus and methods of operation that are further described in the following Brief Description of the Drawings and the Detailed Description of the Invention. Other features and advantages will become apparent from the following detailed description made with reference to the accompanying drawings.

BRIEF DESCRIPTION OF THE SEVERAL VIEWS OF THE DRAWING(S)

DETAILED DESCRIPTION OF THE INVENTION

Figure 1:
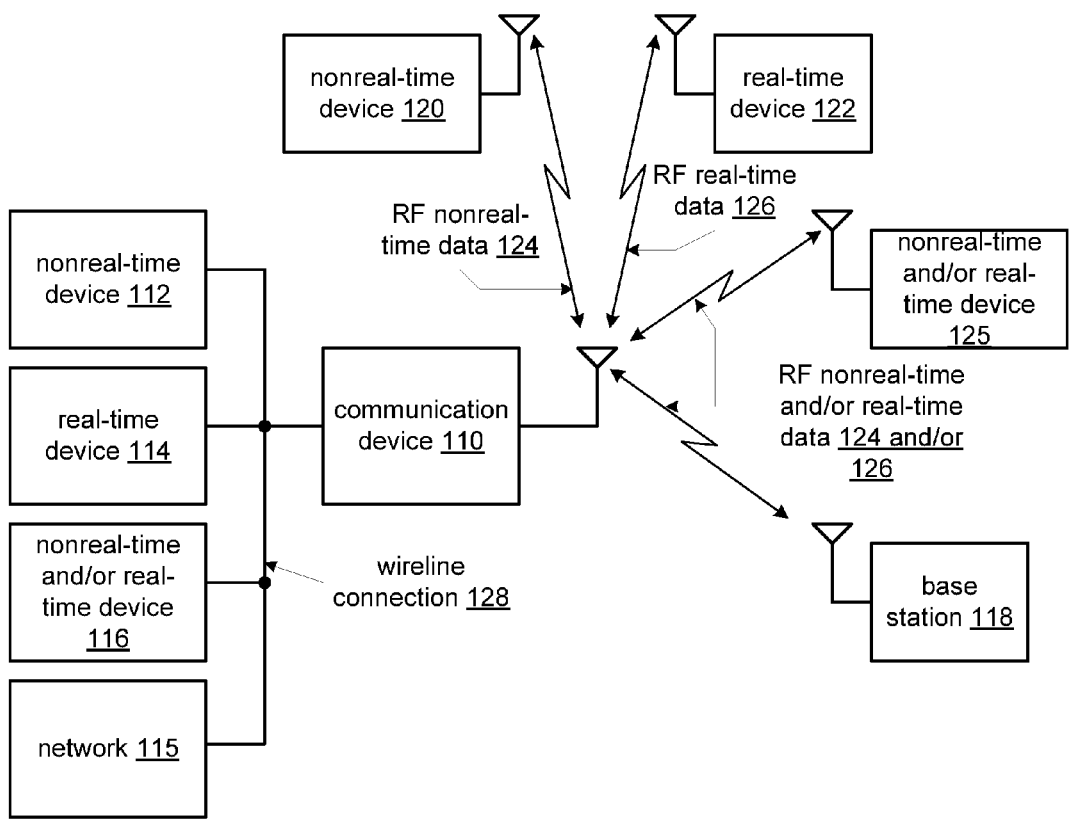
FIG. 1 is a schematic block diagram of an embodiment of a wireless communication system.

FIG. 1 is a schematic block diagram of a communication system in accordance with the technology described herein. In particular, a communication system is shown that includes a communication device 110 that communicates real-time data 126 and/or non-real-time data 124 wirelessly with one or more other devices such as base station 118, non-real-time device 120, real-time device 122, and non-real-time and/or real-time device 125. In addition, communication device 110 can also optionally communicate over a wireline connection with network 115, non-real-time device 112, real-time device 114, and non-real-time and/or real-time device 116.

In an embodiment of the present invention the wireline connection 128 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as WiHD, NGMS, IEEE 802.11a, ac, b, g, n, or other 802.11 standard protocol, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 110.

Communication device 110 can be a mobile phone such as a cellular telephone, a local area network device, personal area network device or other wireless network device, a personal digital assistant, game console, personal computer, laptop computer, or other device that performs one or more functions that include communication of voice and/or data via wireline connection 128 and/or the wireless communication path. Further communication device 110 can be an access point, base station or other network access device that is coupled to a network 115 such as the Internet or other wide area network, either public or private, via wireline connection 128. In an embodiment of the present invention, the real-time and non-real-time devices 112, 114 116, 118, 120, 122 and 125 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 126 includes voice, audio, video and multimedia applications including Internet gaming, etc. The non-real-time data 124 includes text messaging, email, web browsing, file uploading and downloading, etc.

In an embodiment of the present invention, the communication device 110 includes a wireless transceiver that includes one or more features or functions of the present invention. Such wireless transceivers shall be described in greater detail in association with FIGS. 3-12 that follow.

Figure 2:
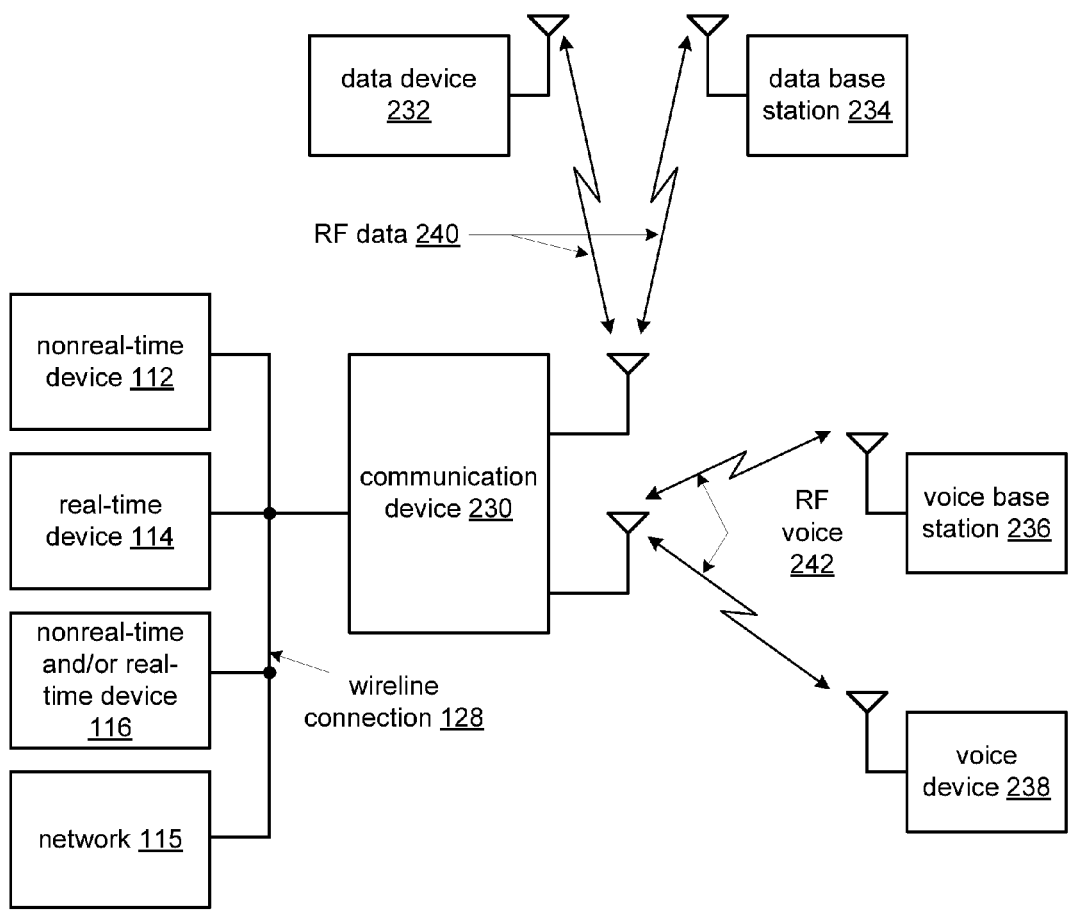
FIG. 2 is a schematic block diagram of another embodiment of a wireless communication system.

FIG. 2 is a schematic block diagram of an embodiment of another communication system in accordance with the present invention. In particular, FIG. 2 presents a communication system that includes many common elements of FIG. 1 that are referred to by common reference numerals. Communication device 230 is similar to communication device 110 and is capable of any of the applications, functions and features attributed to communication device 110, as discussed in conjunction with FIG. 1. However, communication device 230 includes two or more separate wireless transceivers for communicating, contemporaneously, via two or more wireless communication protocols with data device 232 and/or data base station 234 via RF data 240 and voice base station 236 and/or voice device 238 via RF voice signals 242.

Figure 3:
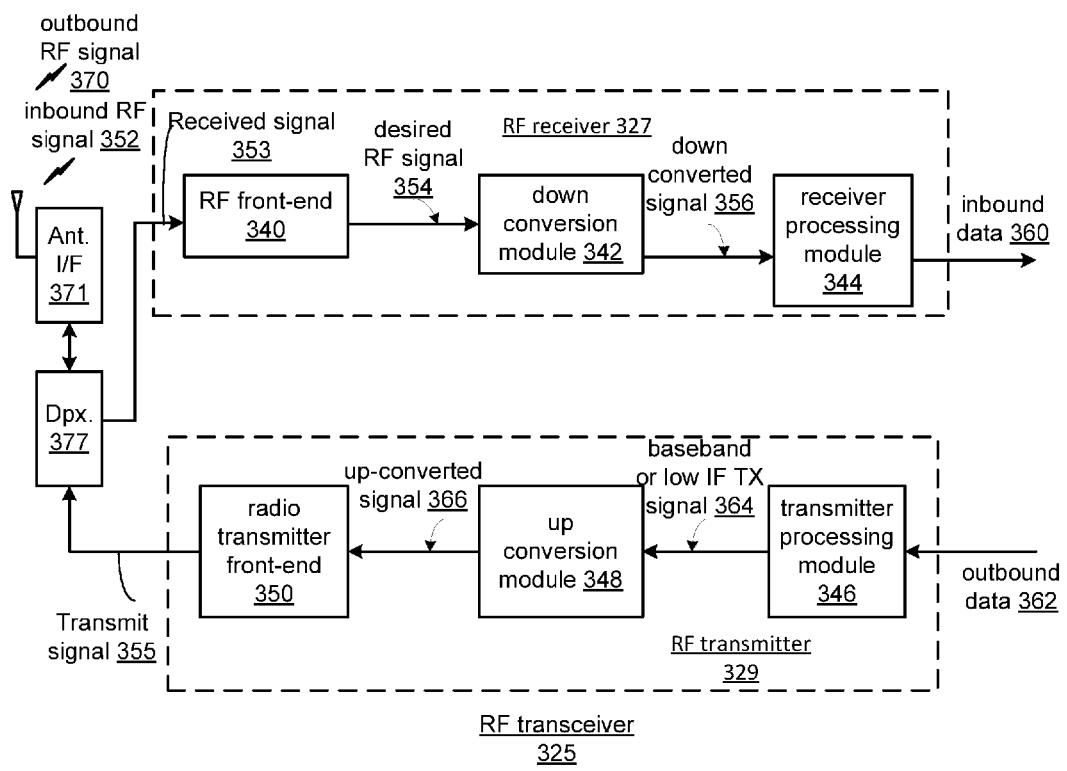
FIG. 3 is a schematic block diagram of an RF transceiver for a wireless communication system.

FIG. 3 is a schematic block diagram of an embodiment of a wireless transceiver 325 in accordance with the present invention. The RF transceiver 325 represents a wireless transceiver for use in conjunction with communication devices 110 or 230, base station 118, non-real-time device 120, real-time device 122, and non-real-time, real-time device 125, data device 232 and/or data base station 234, and voice base station 236 and/or voice device 238. RF transceiver 325 includes an RF transmitter 329, and an RF receiver 327. The RF receiver 327 includes a RF front end 340, a down conversion module 342 and a receiver processing module 344. The RF transmitter 329 includes a transmitter processing module 346, an up conversion module 348, and a radio transmitter front-end 350.

Figure 4:
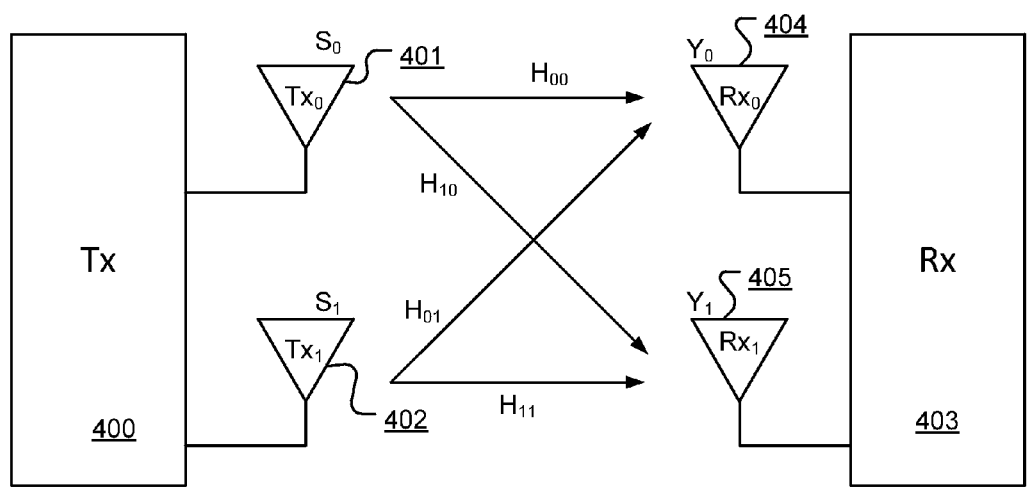
FIG. 4 is a schematic block diagram of a simple two antenna MIMO structure.

As shown, the receiver and transmitter are each coupled to an antenna through an antenna interface 371 and a diplexer (duplexer) 377, that couples the transmit signal 355 to the antenna to produce outbound RF signal 370 and couples inbound signal 352 to produce received signal 353. Alternatively, a transmit/receive switch can be used in place of diplexer 377. While a single antenna is represented in FIG. 3, the receiver and transmitter may share a multiple antenna structure that includes two or more antennas as shown in FIG. 4, discussed in greater detail hereafter.

In operation, the RF transmitter 329 receives outbound data 362. The transmitter processing module 346 packetizes outbound data 362 in accordance with a millimeter wave protocol or wireless telephony protocol, either standard or proprietary, to produce baseband or low intermediate frequency (IF) transmit (TX) signals 364 that includes an outbound symbol stream that contains outbound data 362. The baseband or low IF TX signals 364 may be digital baseband signals (e.g., have a zero IF) or digital low IF signals, where the low IF typically will be in a frequency range of one hundred kilohertz to a few megahertz. Note that the processing performed by the transmitter processing module 346 can include, but is not limited to, scrambling, encoding, puncturing, mapping, modulation, and/or digital baseband to IF conversion.

The up conversion module 348 includes a digital-to-analog conversion (DAC) module, a filtering and/or gain module, and a mixing section. The DAC module converts the baseband or low IF TX signals 364 from the digital domain to the analog domain. The filtering and/or gain module filters and/or adjusts the gain of the analog signals prior to providing it to the mixing section. The mixing section converts the analog baseband or low IF signals into up-converted signals 366 based on a transmitter local oscillation.

The radio transmitter front end 350 includes a power amplifier and may also include a transmit filter module. The power amplifier amplifies the up-converted signals 366 to produce outbound RF signals 370, which may be filtered by the transmitter filter module, if included. The antenna structure transmits the outbound RF signals 370 via an antenna interface 371 coupled to an antenna that provides impedance matching and optional band pass filtration.

The RF receiver 327 receives inbound RF signals 352 via the antenna and antenna interface 371 that operates to process the inbound RF signal 352 into received signal 353 for the receiver front-end 340. In general, antenna interface 371 provides impedance matching of antenna to the RF front-end 340, optional band pass filtration of the inbound RF signal 352.

The down conversion module 342 includes a mixing section, an analog to digital conversion (ADC) module, and may also include a filtering and/or gain module. The mixing section converts the desired RF signal 354 into a down converted signal 356 that is based on a receiver local oscillation, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 356 that includes an inbound symbol stream. Note that the ordering of the ADC module and filtering and/or gain module may be switched, such that the filtering and/or gain module is an analog module.

The receiver processing module 344 processes the baseband or low IF signal 356 in accordance with a millimeter wave protocol, either standard or proprietary, to produce inbound data 360 such as probe data received from a probe device or devices (not shown). The processing performed by the receiver processing module 344 can include, but is not limited to, digital intermediate frequency to baseband conversion, demodulation, demapping, depuncturing, decoding, and/or descrambling.

In an embodiment of the present invention, receiver processing module 344 and transmitter processing module 346 can be implemented via use of a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip. Such a memory device may be a read-only memory, random access memory, volatile memory, non-volatile memory, static memory, dynamic memory, flash memory, and/or any device that stores digital information. Note that when the processing devices implement one or more of their functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

While the processing module 344 and transmitter processing module 346 are shown separately, it should be understood that these elements could be implemented separately, together through the operation of one or more shared processing devices or in combination of separate and shared processing.

In another embodiment, the receiver and transmitter may share a multiple input multiple output (MIMO) antenna structure, diversity antenna structure, phased array or other controllable antenna structure that includes a plurality of antennas and other RF transceivers similar to RF transceiver 325. Each of these antennas may be fixed, programmable, an antenna array or other antenna configuration. Also, the antenna structure of the wireless transceiver may depend on the particular standard(s) to which the wireless transceiver is compliant and the applications thereof.

FIG. 4 illustrates a simple two antenna MIMO structure. A transmitting (Tx) unit 400 is shown having two antennas 401, 402, while a receiving (Rx) unit 403 is shown having two antennas 404, 405. It is to be noted that both transmitting unit 400 and receiving unit 403 are generally both transceivers, but are shown as a separate transmitter (Tx) and receiver (Rx) units for an exemplary purpose in FIG. 4. That is, Tx unit 400 is transmitting data and Rx unit 403 is receiving the transmitted data. The transmitted data symbols at antennas 401 ($Tx_0$), 402 ($Tx_1$) are noted as $S_0$ and $S_1$, respectively. The received data symbols at antennas 404 ($Rx_0$), 405 ($Rx_1$) are noted as $Y_0$ and $Y_1$ respectively. Since the example illustrates a two transmit antenna/two receive antenna MIMO system, the four resulting RF signal paths are noted as $H_{00}$, $H_{01}$, $H1_{10}$, and $H_{11}$ (using the $H_{Tx-Rx}$ notation) and the data path is referred to as channel H. While, the example illustrated is a two antenna structure, the embodiments disclosed herein may operate within other known antenna configurations (e.g., 2×4, 2×8, 4×16, etc.)

Further details including optional functions and features of the RF transceiver are discussed in conjunction with FIGS. 5-12 that follow.

As previously shown in FIG. 3, reception and transmission of communication signals includes a multitude of processing stages (e.g., transmitter processing module 346). Within, and between, these stages, signal error is routinely introduced in the form of distortion. Various elements within the processing path (chain) create various distortions such as DC offset in the baseband analog path or non-linearity in amplification stages. As previously noted, direct conversion receivers usually require a method of cancelling DC offsets. Traditionally this cancellation has been achieved by using a low pass analog feedback circuit, sometimes known as a DC servo.

Figure 5:
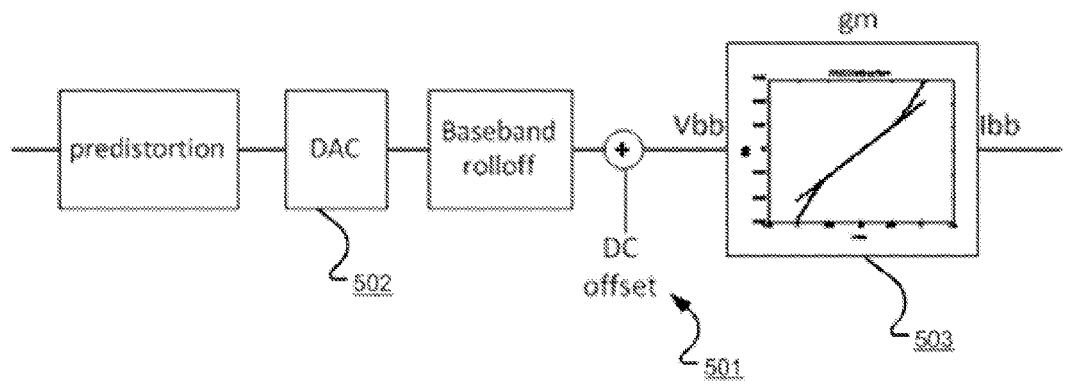
FIG. 5 illustrates an embodiment of the technology described herein where DC offset is introduced by the analog path between a digital-to-analog converter (DAC) and transconductance amplifier (gm amplifier)

FIG. 5 illustrates DC offset 501 as introduced along the analog path between a digital-to-analog converter (DAC) 502 and transconductance amplifier (gm amplifier) 503. When describing a periodic function in the frequency domain, DC offset, or DC coefficient is the mean value of the waveform. In such usage, this coefficient represents the useless DC, while the coefficients representing various other frequencies are analogous to superimposed AC voltages or currents, hence called AC components or AC coefficients. If the mean amplitude is zero, there is no DC offset. DC offset is usually undesirable when it causes saturation or change in the operating point of an amplifier. In order to correct, for example by calibration, DC offset and other distortions created along the analog path, these effects must be recognized and properly reduced.

Figure 6:
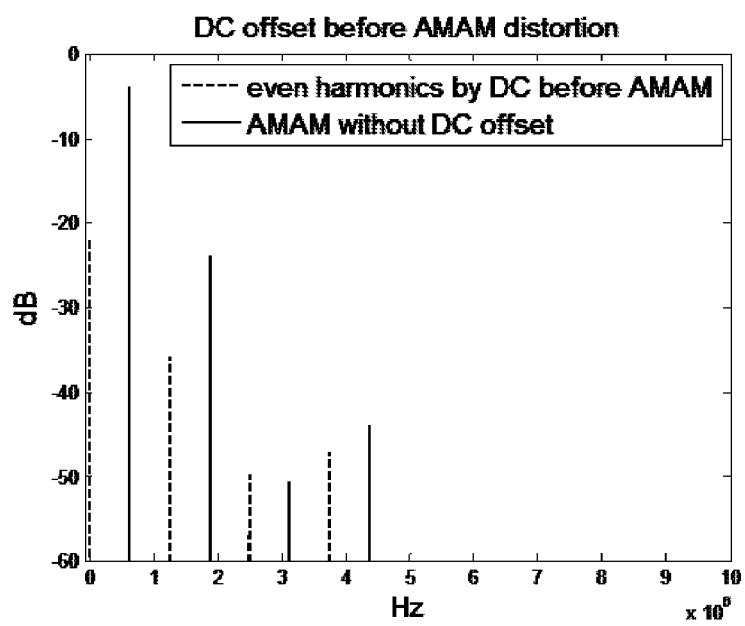
FIG. 6 illustrates a diagram illustrating the effects of the DC offset as shown in FIG. 5.

FIG. 6 illustrates a diagram illustrating the effects of the DC offset 501 as shown in FIG. 5, where, even when gm's have only odd-order nonlinearities with DC offset before gm, even-order harmonic distortions are created.

Figure 7:
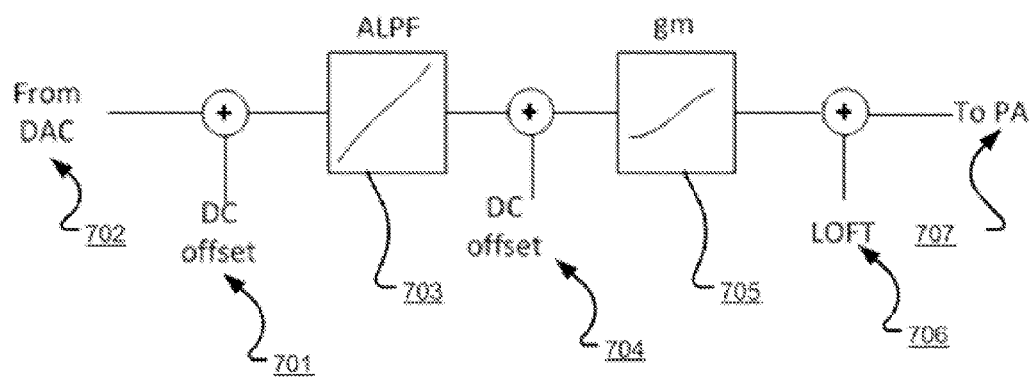
FIG. 7 illustrates an embodiment of the technology described herein where DC offset and nonlinearity may be introduced in multiple locations along the analog path.

FIG. 7 illustrates processing chains where DC offset and nonlinearity may be introduced in multiple locations along the analog path. First, DC offset 701 may be introduced between a digital-to-analog converter (DAC) 702 and an analog low-pass filter (ALPF) 703. Second, DC offset 704 may be introduced between the ALPF and the transconductance amplifier (gm amplifier) 705. As shown, DC offset and other odd-order nonlinearities may be introduced by the ALPF and gm. The ALPF and gm's nonlinearities create odd-order harmonics while the local oscillator feed-through (LOFT) 706 creates zero-th order distortion when observed before power amplifier (PA) 707.

Figure 8:
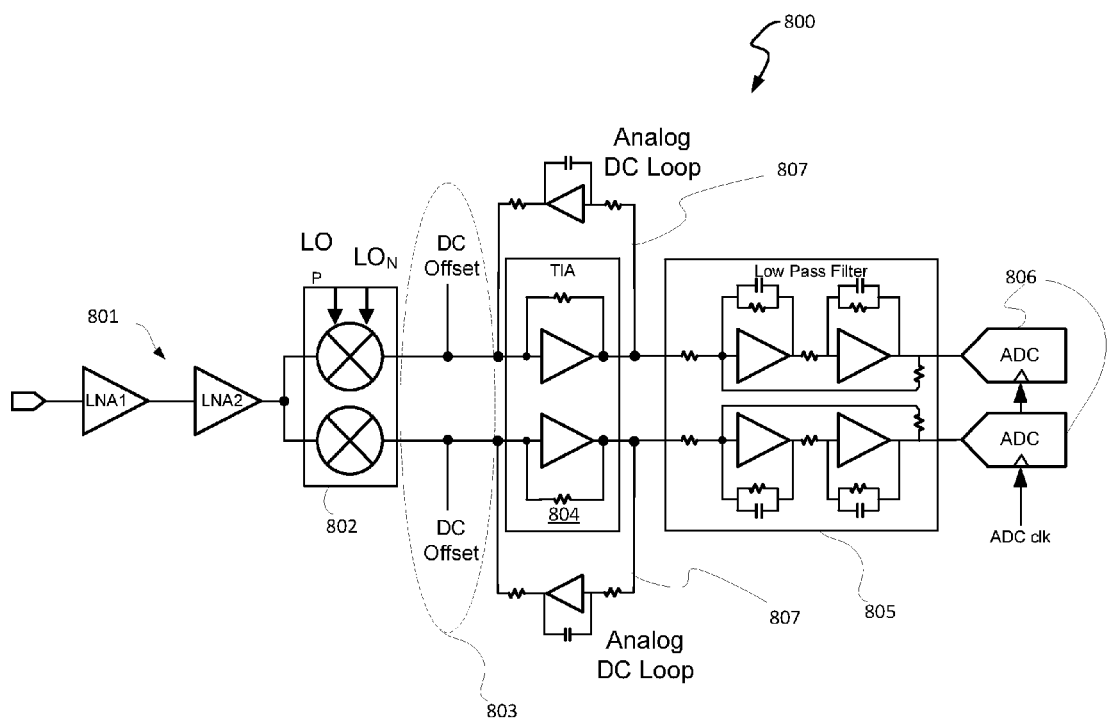
FIG. 8 illustrates a direct conversion receiver embodiment of the technology described herein where DC offset cancellation is introduced along the analog path.

FIG. 8 illustrates a direct conversion receiver 800 embodiment of the technology described herein where DC offset is introduced along the analog path. The direct conversion receiver includes, but is not limited to, front end circuit elements 801 such as low-noise amplifiers (LNA1 and LNA2). The incoming radio signal circuit uses synchronous detection driven by a local oscillator (LO) (not shown) whose frequency is identical to, or very close to the carrier frequency of the intended signal. The local oscillator provides inputs $LO_p$ and $LO_n$ to mixer circuit 802. Output signals from the mixer circuit are amplified by amplifiers such as circuit 804 (e.g., a transimpedance amplifier (TIA)), filtered by low-pass filters 805 and converted to digital signals using analog-to-digital converters 806. Signal leakage paths can occur in the receiver. For example, local-oscillator energy can leak through the mixer stage back and feed back to the antenna input and then re-enter the mixer stage. The overall effect is that the local oscillator energy would self-mix and create DC offset signals 803 illustrated as occurring between the mixer and amplifier (TIA). The offset could be large enough to overload the baseband amplifiers and overcome the wanted signal reception.

Recognition of the need for DC offset correction in a direct conversion receiver is known and many methods exist to accomplish this. A low pass filtering function is fundamental to the operation of DC offset cancellation loops. However, low pass filters in analog feedback loops 807 do not take advantage of the benefits of CMOS technology. For example, an implementation of a low pass function in the digital domain allows numerous advantages of complementary metal-oxide-semiconductor (CMOS) digital signal processing (DSP) to be leveraged (e.g., low chip area requirements, low power, low noise, fast production test times, and transfer functions that are accurate, repeatable and easily programmed). In addition, it allows for the digital storage and estimation of DC offsets thus enabling fast loop settling times. A low offset comparator serves as a highly oversampled ADC for the purposes of DC offset measurement.

In the technology disclosed herein, various embodiments are disclosed using a digital-to-analog converter (DAC) to inject a DC offset cancellation signal which can bring about noise/area/power advantages. In one embodiment, the DAC is driven by a mixed signal low pass filter loop. However, the DAC could also be driven in an open loop system, or a combination of open and closed loop.

Figure 9:
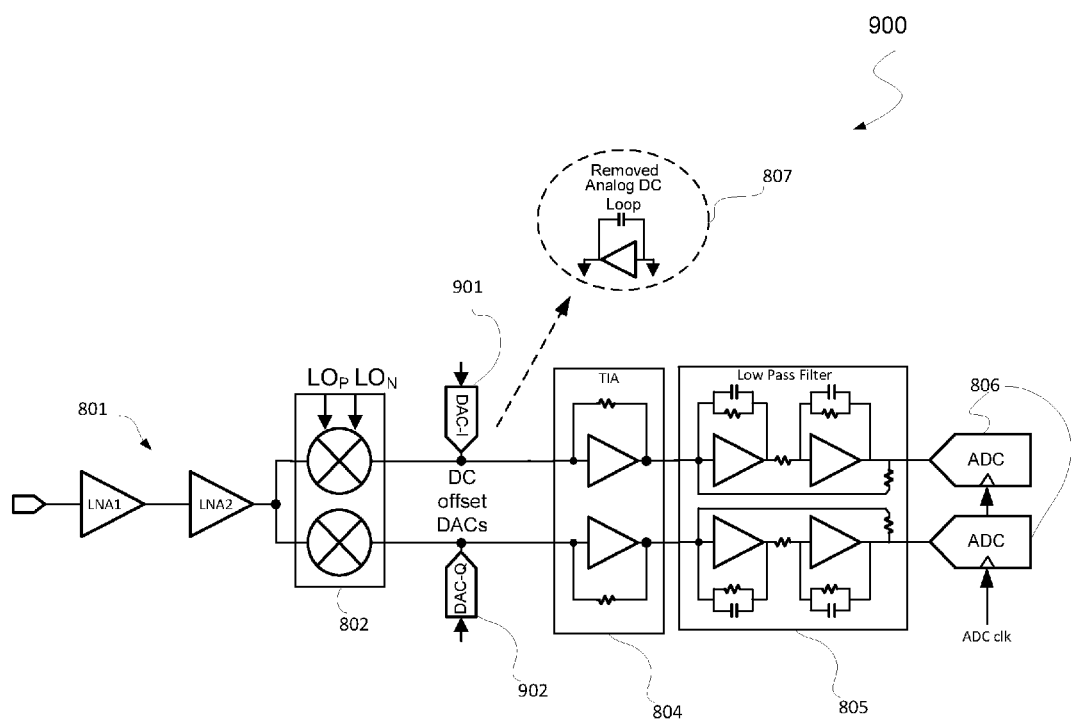
FIG. 9 illustrates one embodiment of the technology described in FIG. 8 comprising suitable circuitry to reduce DC offset in a direct conversion receiver.

FIG. 9 illustrates one embodiment of the technology described in FIG. 8 comprising suitable hardware/software in the form of circuitry, logic gates, and/or code that functions to reduce DC offset in a direct conversion receiver. While illustrated and described with respect to a direct conversion receiver 900, the technology described can be equally used to reduce DC offset in other areas of the analog processing chain. A sign and magnitude DAC is created by connecting DAC-I 901 and DAC-Q 902 comprising, programmable current sources (described in more detail with respect to FIGS. 10-12) to the virtual earth input terminals on a transimpedance amplifier (TIA) op-amp circuit 804. The constant virtual earth voltage eliminates linearity problems that would otherwise exist due to the finite current source output impedance. For good op-amp operation, the virtual earth voltage is usually designed to be at, or close to, half-way between negative and positive supply voltages, providing a large output voltage for both the positive and negative current sources thus allowing them to be low noise. Current sources are only switched in when required so unneeded sources are out of circuit and do not contribute noise or use any power. This embodiment, solves the problem of realising a low noise DAC with low area and power requirements. The use of DACs as described enables removal or exclusion of traditional analog loops 807.

Figure 10:
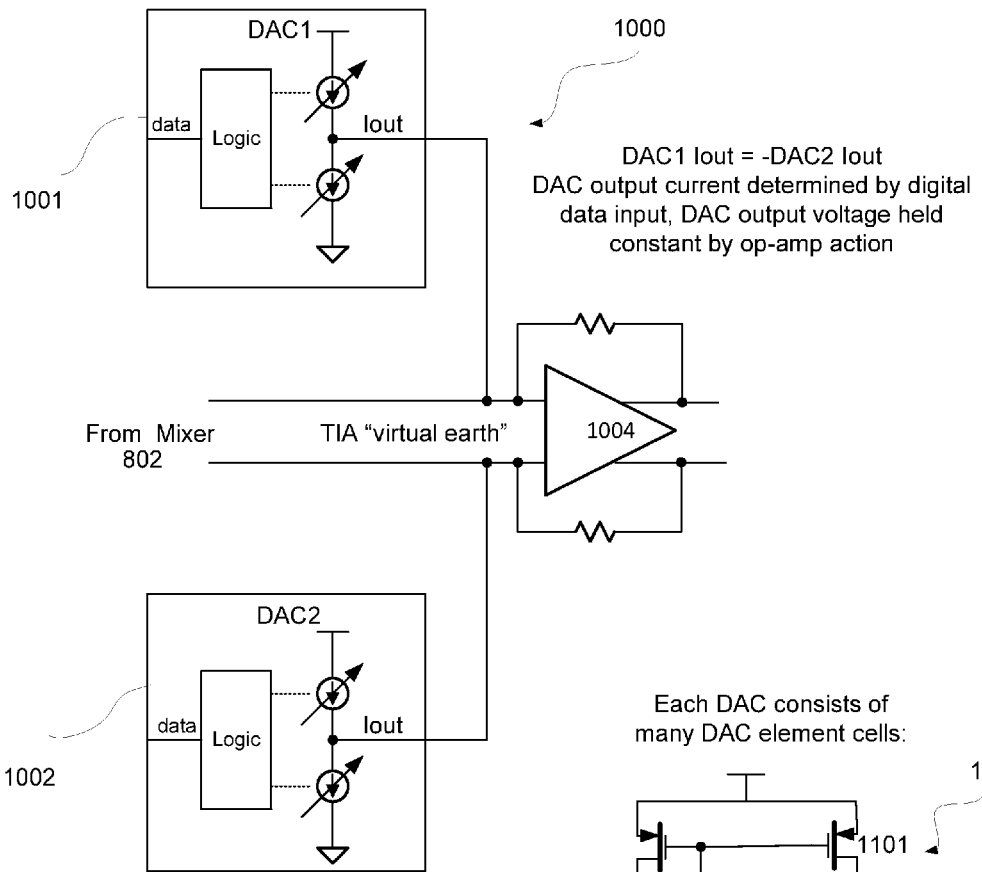
FIG. 10 illustrates one embodiment of the technology described herein comprising suitable circuitry that functions as a DAC DC offset cancellation implementation.
Figure 11:
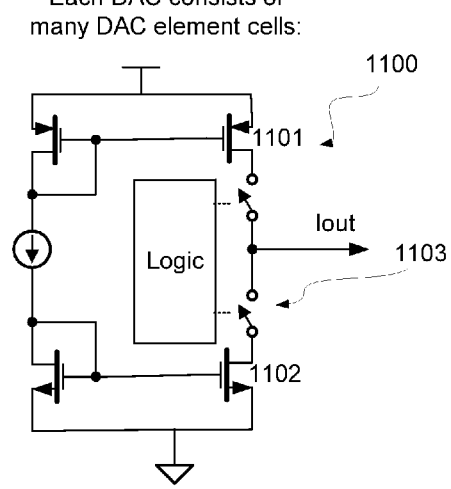
FIG. 11 illustrates one embodiment of the technology described herein which comprises suitable circuitry and/or logic gates that functions as DAC cells.

FIG. 10 illustrates one embodiment of the technology described herein which comprises suitable hardware/software 1000 in the form of circuitry, logic gates, and/or code that functions as a DAC DC offset cancellation implementation (described in greater detail in FIG. 11 description). DAC1 1001 and DAC2 1002 produce output currents (Iout) of equal magnitude and opposite polarity (e.g., if DAC1 produces 1 uA output current sourced from the positive supply, DAC2 sinks 1 uA of current to the negative supply). The injection of this DC current after the mixer 802 and at the TIA 1004 (shown simplified) input terminals adds a DC signal into the signal path. The magnitude of the DAC Iout currents is set via a digital input code such that inherent pre-existing DC offsets (802) in the signal path are cancelled by a DC offset of opposite polarity which is produced by the two DACs 1001 and 1002.

The requirement on an offset DAC are stringent; it must be low noise so as not to degrade receiver sensitivity, it must not introduce signal distortions and it is desirable for it to be low area and low power. The DAC is formed at the "virtual earth" input node of the receive signal path transimpedance amplifier. The DACs are formed of multiple DAC cells 1100 as shown in FIG. 11. The PMOS 1101 and NMOS transistors 1102 form discrete current source/sink elements, respectively. These are enabled or disabled by closing or opening the series switches 1103 based on logic as directed by input DAC digital input codes (data). Many of these DAC element cells are included in parallel to give fine resolution over the magnitude of the current following out of/in to node "Iout". The logic is used to decode a digital input signal, which may be binary weighted, to control signal suitable for controlling the two series switches. As a whole, the plurality of DAC elements forms a complete current DAC (e.g., 1001 or 1002).

Figure 12:
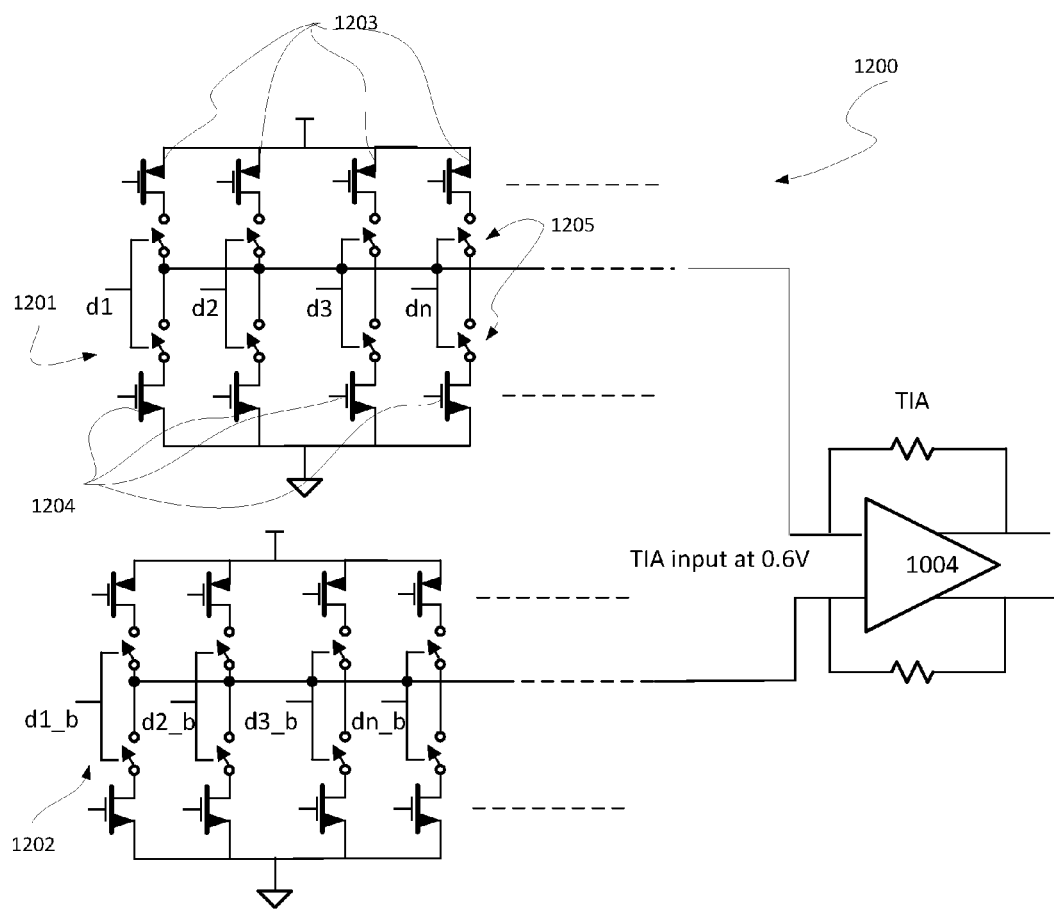
FIG. 12 illustrates one embodiment of the technology described herein which comprises suitable circuitry and/or logic gates that functions as DACs.

FIG. 12 illustrates one embodiment of the technology described herein which comprises suitable hardware/software 1200 in the form of circuitry, logic gates, and/or code that functions as DACs 1201 and 1202 (similar structure and functionality). The DACs are shown with a simplified TIA 1004 without the main receiver (Rx) signal path. As shown, a plurality of transistors form the DC offset DACs. NMOS transistors 1204 form DAC current sinks elements and PMOS transistors 1203 DAC current sources elements. The current sinks and sources are switched 1205 in circuit as required to produce the DC offset correction current as represented by data inputs (e.g., DAC digital input code d1, d2, d3 . . . dn). An equal current is introduced by the PMOS sources as the NMOS sinks so as not to introduce a common mode signal.

Distortions would be introduced by this DAC if the output current it produced was dependant on the Rx signal. Due to the placement of the current source/sink transistors at the virtual earth of the TIA op-amp, the voltage at this node remains constant regardless of Rx signal amplitude. Therefore the output current of the DAC transistor elements does not vary, even if the output impedance of these transistors is not particularly high. This allows for the use of simple (no cascodes or active impedance boosting circuitry) single transistor current source/sinks to be used. This makes them low power, and low area. The "virtual earth" TIA input voltage is usually designed to be significantly higher than the negative supply voltage and significantly lower than the positive supply voltage. This allows for both the PMOS and NMOS transistors to have a large drain to source voltage, which means they can be designed for low transconductance and therefore can be low noise and low area.

The various embodiments described herein can be fully implemented in, but not limited to: an RF receiver, RF transmitter, RF transceiver, user equipment transceiver, base station transceiver, wireless transceiver, LTE transceiver or MIMO transceiver.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operatively connected", "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The technology as described herein has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as CMOS, as one of ordinary skill in the art will appreciate, the transistors may be implemented using any type of transistor structure including, but not limited to, bipolar, field effect (FET) or metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the technology as described herein have been expressly described herein, other combinations of these features and functions are likewise possible. The technology as described herein is not limited by the particular examples disclosed herein and expressly incorporates these other combinations.

The invention claimed is:

1. A communications processing path with DC offset cancellation comprising:
  a direct conversion circuit operative within the communications processing path with one or more sources of DC offset, the direct conversion circuit comprising:
    a mixer with local oscillator inputs receiving communications signals to be converted;
    a transimpedance amplifier (TIA) circuit connected along the communications processing path and amplifying the converted communications signals, and
    a plurality of digital-to-analog converters (DACs) connected to one or more nodes between the mixer and TIA circuit to remove DC offset, and
    wherein the plurality of DACs comprise one or more transistor pairs in series including at least an NMOS transistor forming a DAC current sink and an PMOS transistor to form a DAC current source.

2. The communications processing path of claim 1, wherein the plurality of DACs comprise programmable current sources to produce current represented by a digital code and the TIA circuit comprises a TIA op-amp.

3. The communications processing path of claim 1 further comprises a switch for switching the DAC current sink and DAC current source in circuit to produce the current represented by the digital code.

4. The communications processing path of claim 1, wherein the plurality of DACs comprise a plurality of the one or more transistor pairs in series to form a plurality of parallel DAC current sources.

5. The communications processing path of claim 1, wherein the TIA circuit comprises a TIA op-amp and the DAC source and sink transistors are operatively connected to a virtual earth of the TIA circuit.

6. The communications processing path of claim 5, wherein the virtual earth connection is configured to enable voltage of the plurality of DACs to remain constant regardless of communication signal amplitude.

7. The communications processing path of claim 5, wherein the virtual earth connection is configured to enable output current of each of the DAC transistors to remain constant.

8. The communications processing path of claim 1, wherein the communications processing path with DC offset cancellation is operative in any of: a receiver, transmitter, transceiver, user equipment transceiver, base station transceiver, LTE transceiver or MIMO transceiver.

9. A method for DC offset reduction within a communications signal direct conversion circuit comprising:
  receiving communications signals to be converted;
  mixing local oscillator inputs with the received communications signals to convert the received communications signals;
  reducing DC offset of the converted received communications signals with digital-to-analog converters (DACs) operative with the converted received communications signals and configured as programming current sources by switching one or more transistor pairs comprising an NMOS transistor forming a DAC current sink and an PMOS transistor forming a DAC current source to produce current represented by a digital code, and
  amplifying the DC offset reduced communications signals using a transimpedance amplifier (TIA).

10. The method for DC offset reduction of claim 9 further comprising switching the DAC current sink and the DAC current source in circuit to produce the current represented by the digital code.

11. The method for DC offset reduction of claim 9, wherein the DACs comprise a plurality of the one or more transistor pairs in series to form a plurality of parallel DAC current sources.

12. The method for DC offset reduction of claim 9 further comprising operatively connecting an output of the DACs to a virtual earth of the TIA.

13. The method for DC offset reduction of claim 12, wherein the virtual earth connection enables voltage of the DACs to remain constant regardless of communications signal amplitude.

14. The method for DC offset reduction of 12, wherein the virtual earth connection is configured to enable output current of DAC transistor elements to remain constant.

15. The method for DC offset reduction of claim 9, operative in any of: a receiver, transmitter, transceiver, user equipment transceiver, base station transceiver, LTE transceiver or MIMO transceiver.

16. A communications circuit with DC offset cancellation comprising:
  a direct conversion circuit, operative within the communications circuit, including one or more sources of DC offset, the direct conversion circuit comprising:
  a mixer with local oscillator inputs receiving communications signals to be converted;
  a transimpedance amplifier (TIA) circuit operatively connected to the mixer and amplifying the converted communications signals, and
  a plurality of digital-to-analog converters (DACs) connected to one or more nodes between the mixer and TIA circuit to remove DC offset, and
  wherein the plurality of DACs comprise a plurality of parallel NMOS/PMOS transistor pairs including an NMOS transistor forming a DAC current sink and an PMOS transistor forming a DAC current source.

17. The communications circuit of claim 16 further comprising operatively connecting an output of the plurality of DACs to a virtual earth of the TIA.

18. The communications circuit of claim 16, wherein the virtual earth connection is configured to enable voltage of the DACs to remain constant regardless of communications signal amplitude.

19. The communications circuit of claim 16, wherein the virtual earth connection is configured to enable output current of DAC transistor elements to remain constant.

20. The communications circuit of claim 16 further configured to be operative in any of: a receiver, transmitter, transceiver, user equipment transceiver, base station transceiver, LTE transceiver or MIMO transceiver.

* * * * *